US010885069B2

(12) United States Patent
Ma et al.

(10) Patent No.: US 10,885,069 B2
(45) Date of Patent: Jan. 5, 2021

(54) METHOD FOR COMBINING ENTRY STRUCTURES INCLUDING ENTRY ID, ENTRY TEXT, PARENT ENTRY AND CHILD ENTRY

(71) Applicant: SHANGHAI YIWEI NETWORK TECHNOLOGY CO., LTD, Shanghai (CN)

(72) Inventors: Yechi Ma, Shanghai (CN); Hong Tan, Shanghai (CN)

(73) Assignee: Shanghai Yiwei Network Technology Co., Ltd., Shanghai (CN)

( * ) Notice: Subject to any disclaimer, the term of this patent is extended or adjusted under 35 U.S.C. 154(b) by 27 days.

(21) Appl. No.: 16/600,499

(22) Filed: Oct. 12, 2019

(65) Prior Publication Data
US 2020/0042541 A1 Feb. 6, 2020

Related U.S. Application Data

(63) Continuation of application No. PCT/CN2018/084821, filed on Apr. 27, 2018.

(51) Int. Cl.
*G06F 16/28* (2019.01)
*G06F 16/22* (2019.01)
*G06F 16/25* (2019.01)
*G06F 40/289* (2020.01)
*G06N 5/02* (2006.01)
*G06N 7/00* (2006.01)

(52) U.S. Cl.
CPC ........ *G06F 16/285* (2019.01); *G06F 16/2228* (2019.01); *G06F 16/252* (2019.01); *G06F 16/258* (2019.01); *G06F 40/289* (2020.01); *G06N 5/02* (2013.01); *G06N 7/00* (2013.01)

(58) Field of Classification Search
CPC .. G06F 16/285; G06F 16/2228; G06F 16/258; G06F 16/252; G06F 40/289; G06N 5/02; G06N 7/00
USPC ......................................... 707/693
See application file for complete search history.

(56) References Cited

U.S. PATENT DOCUMENTS

2016/0092557 A1\* 3/2016 Stojanovic ............ G06F 16/254
707/723
2016/0314195 A1 10/2016 Markman et al.
(Continued)

FOREIGN PATENT DOCUMENTS

CN 102591986 A 7/2012

OTHER PUBLICATIONS

Liu, Yuhang; "A Chinese Domain Ontology Construction Method Based Baidu Baike"; China's Master's These Full-Text Database; No. 03; Mar. 15, 2016; ISSN 1674-0246; pp. 26-28, 42-43.

*Primary Examiner* — Alicia M Antoine
(74) *Attorney, Agent, or Firm* — Wayne & Ken, LLC; Tony Hom

(57) ABSTRACT

The present invention discloses a method for combining entry structures, by which similar entry structures can be automatically combined. By this method, the efficiency in both retrieving entries and acquiring knowledge is improved. In a technical solution, this method comprises: converting an entry structure into a text; combining, in the format of text and based on a cosine similarity between entries and a cosine similarity between entries and texts, a plurality of texts into one text; and converting the combined text back to the entry structure.

7 Claims, 7 Drawing Sheets

(56) References Cited

U.S. PATENT DOCUMENTS

2017/0091270 A1* 3/2017 Guo .................. G06F 16/58
2017/0286835 A1* 10/2017 Ho .................. G06F 16/367

* cited by examiner

Entry structure 1:

Entry structure 2:

METHOD FOR COMBINING ENTRY STRUCTURES INCLUDING ENTRY ID, ENTRY TEXT, PARENT ENTRY AND CHILD ENTRY

CROSS-REFERENCE TO RELATED APPLICATIONS

This application is a continuation of International Patent Application No. PCT/CN2018/084821, filed on Apr. 27, 2018, which claims the benefit of priority from Chinese Patent Application No. 201710131120.9, filed on Mar. 7, 2017. The contents of the aforementioned application, including any intervening amendments thereto, are incorporated herein by reference in its entirety.

TECHNICAL FIELD

The present invention relates to a method for combining entry structures, and in particular to a method for combining entry structures based on the cosine similarity.

BACKGROUND OF THE PRESENT INVENTION

In an information platform based on entry structures, as the number of users increases, many users will define and structure a same knowledge system. During the search of entries, inevitably, there are a large number of identical or similar explanations for an entry, which may bring trouble to the users and also reduce the efficiency of knowledge acquisition.

In the past, similar entries were combined manually by the administrators of the information platform. However, this manual combination method is time-consuming and labor-intensive, and also limited by the administrators' own knowledge reserve. And, manual combination may lead to many combination errors.

Therefore, at present, there is an urgent need for a method for automatically combining similar entry structures.

SUMMARY OF THE PRESENT INVENTION

The brief summary of one or more aspects will be given below, in order to provide basic understanding of those aspects. This summary is not an extensive overview of all aspects that are conceived, and is not intended to identify key or critical elements of all aspects or to delineate the scope of any or all of the aspects. Its sole purpose is to present some concepts of one or more aspects in a simplified form as a prelude to the more detailed description that is presented later.

To solve the above problem, the present invention provides a method for combining entry structures, by which similar entry structures can be automatically combined. By this method, the efficiency of entry retrieval and knowledge acquisition is improved.

In a technical solution of the present invention, the present invention discloses a method for combining entry structures, comprising:

a first step of converting an entry structure into a text;

a second step of combining, in the format of text and based on a cosine similarity between entries and a cosine similarity between entries and texts, a plurality of texts into one text; and a third step of converting the combined text back to the entry structure.

In an embodiment of the method for combining entry structures according to the present invention, in the first step, entry attributes in an entry structure are stored in accordance with key-value pairs by hash storage, the entry attributes including entry ID, entry name, entry text, parent entry and children entry; and during the conversion of the entry structure into the text, entry attributes of a root entry in an entry structure and entry attributes of all sub-entries of the root entry are read in the format of text.

In an embodiment of the method for combining entry structures according to the present invention, the second step further comprises:

S1: using a first text as a primary combination subject and a second text as a secondary combination subject;

S2: traversing all entries of the first text by a root entry in the second text to obtain corresponding cosine similarities;

S3: comparing the cosine similarities obtained in the S2, to obtain a value of a maximum cosine similarity;

S4: executing S5 if the value of the maximum cosine similarity obtained in the S3 is greater than a first threshold, otherwise executing S7;

S5: recording an entry that corresponds to the value of the maximum cosine similarity in the primary combination subject, and combining a root entry in the secondary combination subject into the recorded corresponding entry in the primary combination subject;

S6: calculating a cosine similarity between any two of all sub-entries of the combined entry, combining the two entries if the cosine similarity is greater than the first threshold, and repeating the S6 on the combined entry until the cosine similarity between any two of all sub-entries of the combined entry is less than the first threshold;

S7: using the second text as the primary combination subject and the first text as the secondary combination subject;

step 8: traversing all entries in the second text by the root entry in the first text to obtain a corresponding cosine similarity;

S9: comparing the cosine similarities obtained in the S8, to obtain a value of a maximum cosine similarity;

S10: executing S11 if the value of the maximum cosine similarity obtained in the S9 is greater than the first threshold, otherwise executing S13;

S11: recording an entry that corresponds to the value of the maximum cosine similarity in the primary combination subject, and combining a root entry in the secondary combination subject into the recorded corresponding entry in the primary combination subject;

S12: calculating a cosine similarity between any two of all sub-entries of the combined entry, combining the two entries if the cosine similarity is greater than the first threshold, and repeating the S12 on the combined entry until the cosine similarity between any two of all sub-entries of the combined entry is less than the first threshold;

S13: again, using the first text as the primary combination subject and the second text as the secondary combination subject;

S14: traversing texts of all entries of the first text by the root entry in the second text to obtain corresponding cosine similarities;

S15: comparing the cosine similarities obtained in the S14, to obtain a value of a maximum cosine similarity;

S16: executing S17 if the value of the maximum cosine similarity obtained in the S15 is greater than a second threshold, otherwise executing S18;

S17: recording an entry that corresponds to the value of the maximum cosine similarity in the primary combination subject, and combining the root entry in the secondary combination subject into the recorded corresponding entry in the primary combination subject;

S18: using the second text as the primary combination subject and the first text as the secondary combination subject;

S19: traversing texts of all entries in the second text by the root entry in the first text to obtain corresponding cosine similarities;

S20: comparing the cosine similarities obtained in the S19, to obtain a value of a maximum cosine similarity;

S21: executing S22 if the value of the maximum cosine similarity obtained in the S20 is greater than the second threshold, otherwise determining that the texts of the two entries are not correlated; and S22: recording an entry that corresponds to the value of the maximum cosine similarity in the primary combination subject, combining the root entry in the secondary combination subject into the recorded corresponding entry in the primary combination subject, and ending the combination.

In an embodiment of the method for combining entry structures according to the present invention, the second step further comprises:

S1: comparing the number of entries in a first text and the number of entries in a second text, and using the text with a greater number of entries as a primary combination subject and the text with a smaller number of entries as a secondary combination subject;

S2: traversing all entries in the primary combination subject by all entries in the secondary combination subject to obtain corresponding cosine similarities;

S3: comparing the cosine similarities obtained in the S2, to obtain a value of a maximum cosine similarity;

S4: executing S5 if the value of the maximum cosine similarity obtained in the S3 is greater than a first threshold, otherwise executing S7;

S5: recording two entries that correspond to the maximum cosine similarity in the primary combination subject and the secondary combination subject, combining the entry in the secondary combination subject into the entry in the primary combination subject, and keeping the secondary combination subject unchanged;

S6: calculating a cosine similarity between any two of all sub-entries of the combined entry in the primary combination subject, combining the two entries if the cosine similarity is greater than the first threshold, repeating the S6 on the combined entry until the cosine similarity between any two of all sub-entries of the combined entry is less than the first threshold, and ending the combination;

S7: traversing texts of all entries in the primary combination subject by all entries in the secondary combination subject to obtain corresponding cosine similarities;

S8: comparing the cosine similarities obtained in the S7, to obtain a value of a maximum cosine similarity;

S9: executing S10 if the value of the maximum cosine similarity obtained in the S8 is greater than a second threshold, otherwise determining that the two texts are not correlated; and S10: recording entries that correspond to the maximum cosine similarity in the secondary combination subject and entries that correspond to the corresponding texts in the primary combination subject, combining the recorded entries in the secondary combination subject into the recorded entries in the primary combination subject, keeping the text that is the secondary combination subject unchanged, and ending the combination.

In an embodiment of the method for combining entry structures according to the present invention, the calculation of a cosine similarity between entries comprises:

S1: importing a genism database;

S2: importing all entries in the primary combination subject into a list of texts, with the entries being separated by commas;

S3: vectorizing all entries;

S4: constructing a corresponding TD_IDF model by vector values obtained in the S3;

S5: calculating a TD_IDF value of each entry by the TD_IDF model;

S6: constructing a corresponding LSI model by the TD_IDF value of each entry;

S7: importing a root entry in the secondary combination subject, and vectorizing the root entry;

S8: importing a vector value of the root entry in the secondary combination subject obtained in the S7 into the LSI model constructed in the S6;

S9: importing the vector values of the entries obtained in the S3 into the LSI model constructed in the S6, and constructing a cosine similarity calculation model; and S10: importing the values obtained in the S8 into the cosine similarity calculation model, and outputting cosine similarities between the root entry in the secondary combination subject and all entries in the primary combination subject.

In an embodiment of the method for combining entry structures according to the present invention, the calculation of a cosine similarity between entries and texts comprises:

S1: importing a genism database;

S2: importing texts corresponding to all entries in the primary combination subject into a list of texts, with the texts being separated by commas;

S3: vectorizing all texts;

S4: constructing a corresponding TD_IDF model by vector values obtained in the S3;

S5: calculating a TD_IDF value of each entry by the TD_IDF model;

S6: constructing a corresponding LSI model by the TD_IDF value of each entry;

S7: importing a root entry in the secondary combination subject, and vectorizing the root entry;

S8: importing the vector value obtained in the S7 into the LSI model constructed in the S6;

S9: importing the vector values obtained in the S3 into the LSI model constructed in the S6, and constructing a cosine similarity calculation model; and S10: importing the values obtained in the S8 into the cosine similarity calculation model, and calculating cosine similarities between texts corresponding to the root entry in the secondary combination subject and all entries in the primary combination subject.

In an embodiment of the method for combining entry structures according to the present invention, during the conversion of the text back to the entry structure in the third step, entry attributes involved in the text are stored as an entry structure in accordance with key-value pairs by hash storage, the entry attributes including entry ID, entry name, entry text, parent entry and children entry.

In an embodiment of the method for combining entry structures according to the present invention, the third step further comprises:

S1: giving, by using a basic command hgetall of redis hash, attributes of a root entry and attributes of all sub-entries of the root entry to a certain object;

S2: loading a D3.js open source library in a web front-end;

S3: defining one tree object by using a command d3.layout.tree, and determining the size of an image region;

S4: requesting, by the web front-end, data from a server, and transmitting, by the server, the object in the S1 to the web front end in the format of JSON;

S5: generating a set of nodes according to the JSON data in the S4; and

S6: generating nodes according to the set of nodes;

S7: acquiring a set of relationships of nodes by a command tree.links(nodes);

S8: setting a Bezier curve for the set of relationships for connection;

S9: adding a circular mark for nodes, with black circular marks for nodes having children nodes and white circular marks for nodes having no children nodes;

S10: adding written descriptions to nodes according to the text attribute of the JSON data; and S11: completing the conversion of the text back to the structure.

Compared with the prior art, the present invention has the following beneficial effects. In the present invention, an entry structure is converted into a text; similar texts are then combined, based on a cosine similarity; and finally, the combined text is converted back to the entry structure. In this way, by this method, several similar entry structures can be automatically combined into one new entry structure. It is convenient for the management of entry structures in the information platform, and this also improves the use experience of the information platform.

DETAILED DESCRIPTION OF THE PRESENT INVENTION

Figure 1:
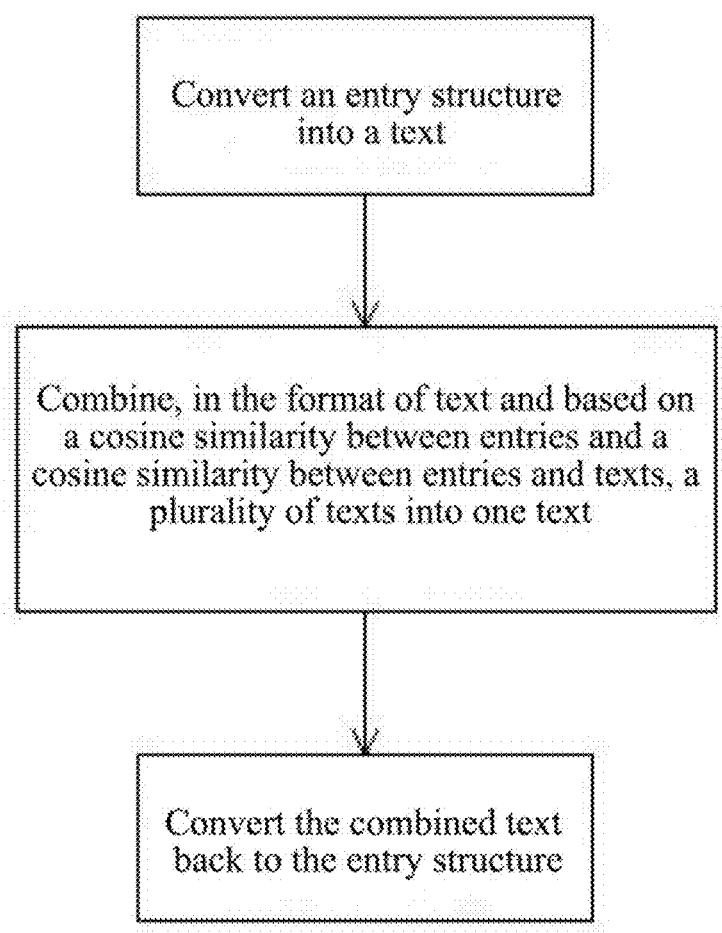
FIG. 1 shows an overall flowchart of an embodiment of a method for combining entry structures, according to the present invention.

The above features and advantages of the present invention can be better understood by reading the detailed description of embodiments of the present disclosure with reference to the accompanying drawings. In the drawings, components are not necessarily drawn to scale, and components with similar related characteristics or features may be indicated by the same or similar reference numerals.

First Embodiment of the Method for Combining Entry Structures

FIG. 1 shows the implementation of the method for combining entry structures, according to the present invention. The method is implemented by following three steps of: first, converting an entry structure into a text; then combining, in the format of text and based on a cosine similarity between entries and a cosine similarity between entries and texts, a plurality of texts into one text; and finally, converting the combined text back to the entry structure.

Figure 2:
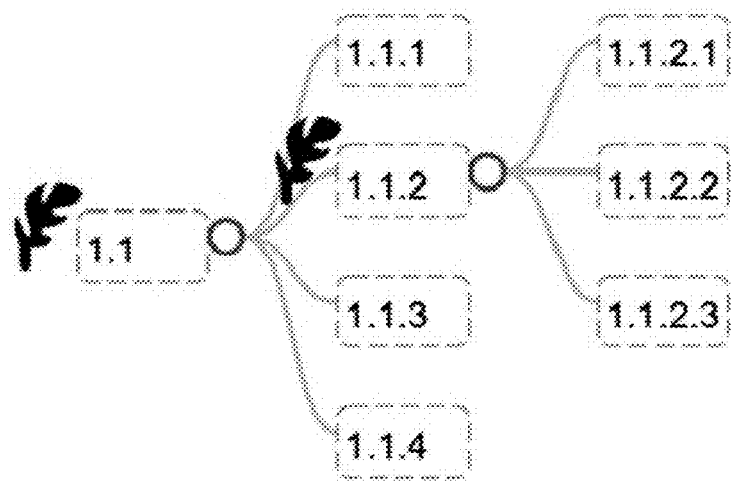
FIG. 2 shows two entry structures used as an example, according to the present invention.
Figure 2:
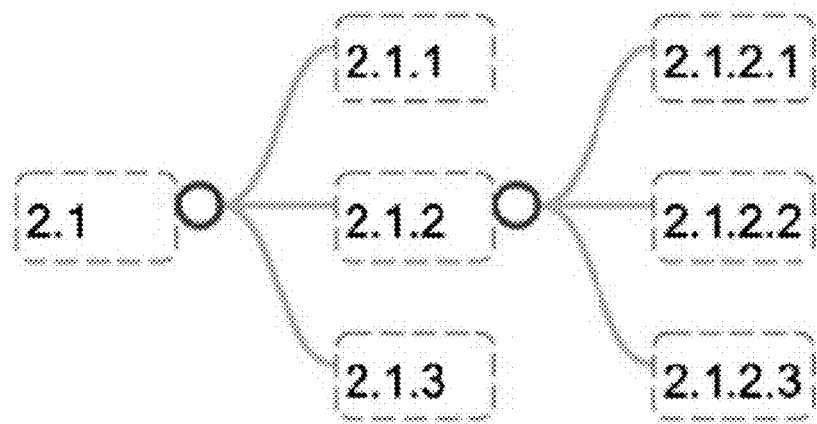

In the description of this embodiment, two entry structures shown in FIG. 2 are used as an example. The entry attributes include entry ID, entry name, entry text, parent entry and children entry. During the conversion of the entry structure into the text, entry attributes of a root entry in an entry structure and entry attributes of all sub-entries of the root entry are read in the format of text.

At present, a D3 open source library is usually used for the structured display of the network. That is, the D3 open source library displays entries stored in a server in a tree diagram. Entry attributes are stored in accordance with key-value pairs, i.e., a mapping table of a string-type field and a value. Therefore, hash storage is applicable to the above storage. The entry with an ID of 888 is a root entry of a certain structure and thus its parent entry is null. That is, there is no parent entry.

In the web rear-end, the entries and the entry attributes are stored in a key-value database redis. The entry attributes of each created entry are stored in the database redis by hash storage. When it is necessary to convert the format, attributes of the root entry and attributes of all sub-entries of the root entry are taken out, by using a basic command hgetall of redis hash. As shown in FIG. 2, an example of partial storage information of the entry structure in the database is as follows:

ID: 888
name: 1.1
text: aaaabbbbcccc
parent: null
children: 1.1.1 1.1.2 1.1.3 1.1.4
ID: 999
name: 1.1.2
text: ddddeeeeffff
parent: 1
children: 1.1.2.1 1.1.2.2 1.1.2.3

By the conversion of an entry structure into a text, the first structure is converted into a first text and the second structure is converted into a second text. An example of conversion of two structures shown in FIG. 2 into texts is as follows:

First text:

| Frist layer: | 1.1 | | | |
|---|---|---|---|---|
| Second layer: | 1.1.1 | 1.1.2 | 1.1.3 | 1.1.4 |
| Third layer: | 1.1.2.1 | 1.1.2.2 | 1.1.2.3 | |

Second text:

| First layer: | 2.1 | | |
|---|---|---|---|
| Second layer: | 2.1.1 | 2.1.2 | 2.1.3 |
| Third layer: | 2.1.2.1 | 2.1.2.2 | 2.1.2.3 |

Figure 3:
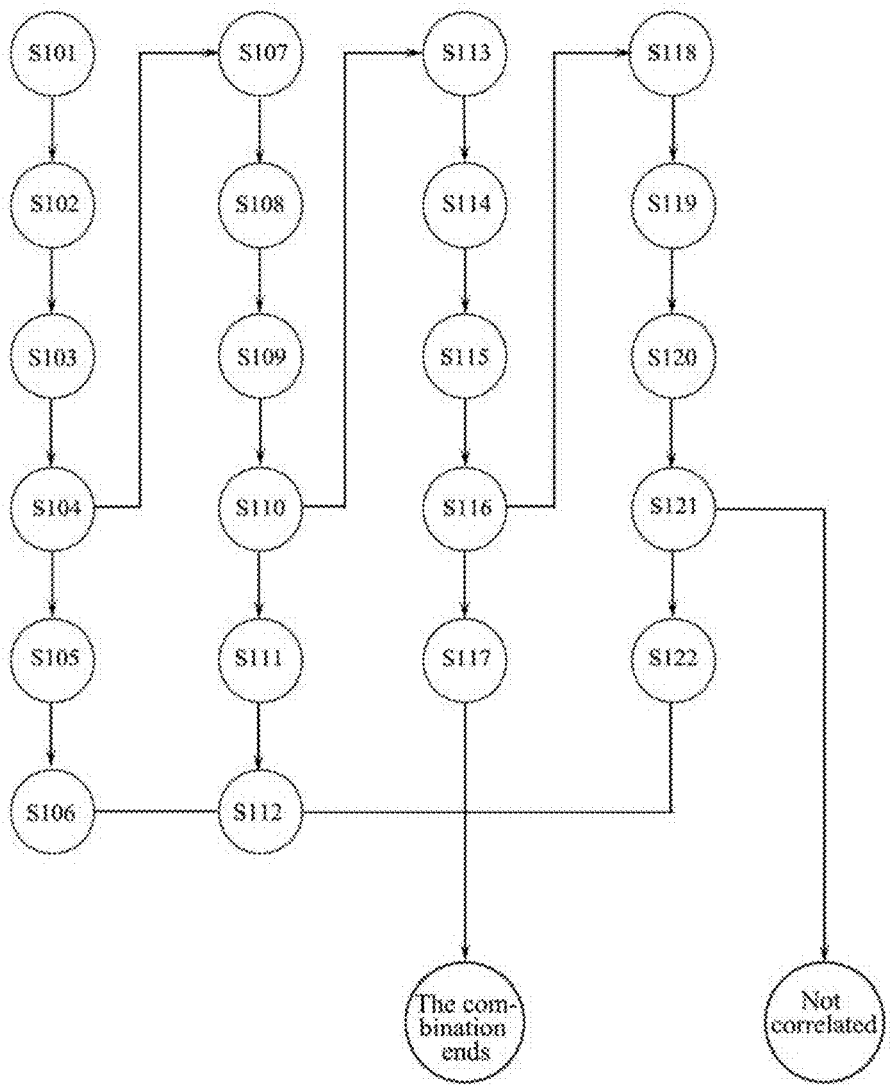
FIG. 3 shows a flowchart of a first embodiment of text combination, according to the present invention.

The combination of combinations is implemented, based on a cosine similarity between entries and a cosine similarity between entries and texts. The specific implementation steps are shown in FIG. 3. The steps shown in FIG. 3 will be described in detail below.

S101: A first text is used as a primary combination subject and a second text is used as a secondary combination subject.

S102: All entries of the first text are traversed by a root entry in the second text to obtain corresponding cosine similarities.

S103: The cosine similarities obtained in the S102 are compared, to obtain a value of a maximum cosine similarity.

S104: S105 is executed if the value of the maximum cosine similarity obtained in the S103 is greater than a first threshold (for example, 80%), otherwise S107 is executed.

S105: An entry that corresponds to the value of the maximum cosine similarity in the primary combination subject is recorded, and a root entry in the secondary combination subject is combined into the recorded corresponding entry in the primary combination subject.

For example, the recorded entry that corresponds to the value of the maximum cosine similarity in the primary combination subject is 1.1.3, and the root entry 2.1 in the secondary combination subject is combined into the entry 1.1.3. Specifically, the name of the root entry 2.1 and the name of the entry 1.1.3 are combined as the name of the entry 1.1.3, and the text of the root entry 2.1 and the text of the entry 1.1.3 are combined in segments, and the sub-entries of the root entry 2.1 and the sub-entries of the original entry 1.1.3 become the sub-entries of the new entry 1.1.3.

S106: A cosine similarity between any two of all sub-entries of the combined entry (for example, the new entry 1.1.3) is calculated, the two entries are combined if the cosine similarity is greater than the first threshold (80%) (the combination rule is the same as that in S105), and the S106 is repeated on the combined entry until the cosine similarity between any two of all sub-entries of the combined entry is less than the first threshold.

S107: The second text is used as the primary combination subject and the first text is used as the secondary combination subject.

S108: All entries in the second text are traversed by the root entry in the first text to obtain a corresponding cosine similarity.

S109: The cosine similarities obtained in the S108 are compared, to obtain a value of a maximum cosine similarity.

S110: S111 is executed if the value of the maximum cosine similarity obtained in the S109 is greater than the first threshold (80%), otherwise S113 is executed.

S111: An entry that corresponds to the value of the maximum cosine similarity in the primary combination subject is recorded, and a root entry in the secondary combination subject is combined into the recorded corresponding entry in the primary combination subject.

For example, the recorded entry that corresponds to the value of the maximum cosine similarity in the primary combination subject is 2.1.2.2, and the root entry 1.1 in the secondary combination subject is combined into the corresponding entry 2.1.2.2. Specifically, the name of the root entry 1.1 and the name of the entry 2.1.2.2 are combined as the name of the entry 2.1.2.2, and the text of the root entry 1.1 and the text of the entry 2.1.2.2 are combined in segments, and the sub-entries of the root entry 1.1 and the sub-entries of the original entry 2.1.2.2 become the sub-entries of the new entry 2.1.2.2.

S112: A cosine similarity between any two of all sub-entries of the combined entry is calculated, the two entries are combined if the cosine similarity is greater than the first threshold (80%) (the combination rule is the same as that in S111), and the S112 is repeated on the combined entry until the cosine similarity between any two of all sub-entries of the combined entry is less than the first threshold (80%).

S113: Again, the first text is used as the primary combination subject and the second text is used as the secondary combination subject.

S114: Texts of all entries of the first text are traversed by the root entry in the second text to obtain corresponding cosine similarities.

S115: The cosine similarities obtained in the S114 are compared, to obtain a value of a maximum cosine similarity.

S116: S117 is executed if the value of the maximum cosine similarity obtained in the S115 is greater than a second threshold (60%), otherwise S118 is executed.

S117: An entry that corresponds to the value of the maximum cosine similarity in the primary combination subject is recorded, and the root entry in the secondary combination subject is combined into the recorded corresponding entry in the primary combination subject.

For example, the recorded entry that corresponds to the value of the maximum cosine similarity in the primary combination subject is 1.1.3, and the root entry 2.1 in the secondary combination subject is combined into the corresponding entry 1.1.3. Wherein, the name of the root entry 2.1 and the name of the entry 1.1.3 are combined as 2.1&1.1.3, and the text of the root entry 2.1 and the text of the original entry 1.1.3 are combined in segments, and the sub-entries of the root entry 2.1 and the sub-entries of the original entry 1.1.3 become the sub-entries of the entry 2.1&1.1.3. So far, the combination ends.

S118: The second text is used as the primary combination subject and the first text is used as the secondary combination subject.

S119: Texts of all entries in the second text are traversed by the root entry in the first text to obtain corresponding cosine similarities.

S120: The cosine similarities obtained in the S119 are compared, to obtain a value of a maximum cosine similarity.

S121: S122 is executed if the value of the maximum cosine similarity obtained in the S120 is greater than the second threshold (60%), otherwise it is determined that the texts of the two entries are not correlated.

S122: An entry that corresponds to the value of the maximum cosine similarity in the primary combination subject is recorded, and the root entry in the secondary combination subject is combined into the recorded corresponding entry in the primary combination subject. So far, the combination ends.

For example, the recorded entry that corresponds to the value of the maximum cosine similarity in the primary combination subject is 2.1.2.2, and the root entry 1.1 in the secondary combination subject is combined into the corresponding entry 2.1.2.2. Wherein, the name of the root entry 1.1 and the name of the entry 2.1.2.2 are combined as 1.1&2.1.2.2, and the text of the root entry 1.1 and the text of the entry 2.1.2.2 are combined in segments, and the sub-entries of the root entry 1.1 and the sub-entries of the entry 2.1.2.2 become the sub-entries of the entry 1.1&2.1.2.2. So far, the combination ends.

Figure 5:
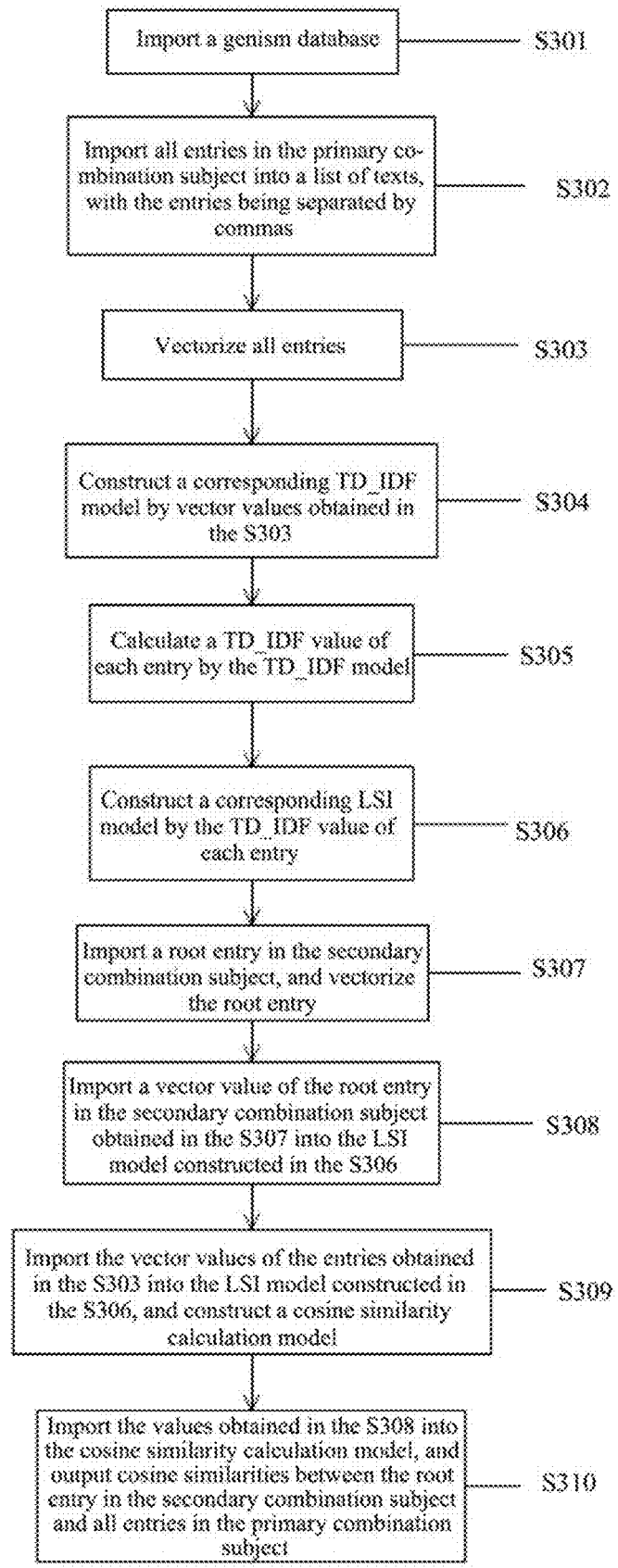
FIG. 5 shows a flowchart of calculating a cosine similarity between entries, according to the present invention.
Figure 6:
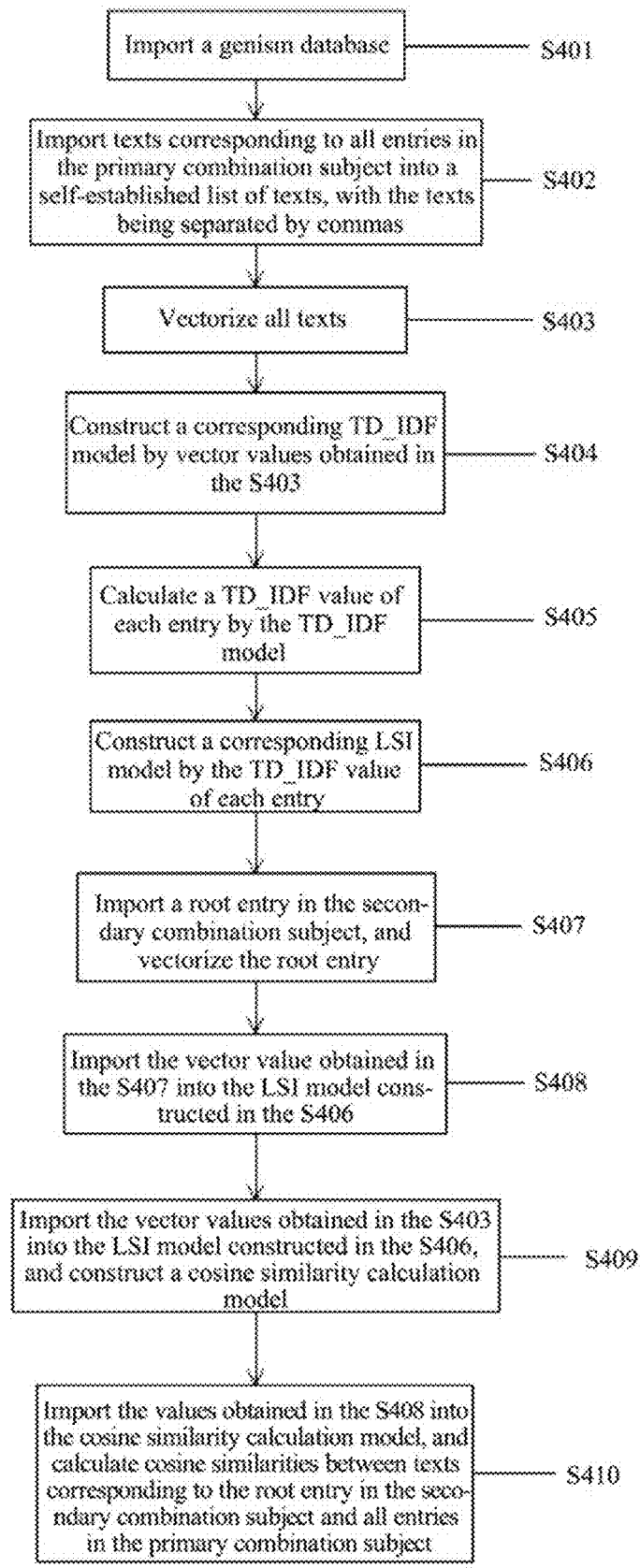
FIG. 6 shows a flowchart of calculating a cosine similarity between entries and texts, according to the present invention.

In the text combination steps shown in FIG. 3, the calculation of a cosine similarity between entries and a cosine similarity between entries and texts is involved. FIG. 5 shows the calculation of a cosine similarity between entries, and FIG. 6 shows the calculation of a cosine similarity between entries and texts.

Referring to FIG. 5 that shows the calculation of a cosine similarity between entries, the implementation steps will be described in detail below.

S301: A genism database is imported.

S302: All entries in the primary combination subject are imported into a self-established list of texts, with the entries being separated by commas.

S303: All entries are vectorized.

S304: A corresponding TD_IDF (term frequency-inverse document frequency) model is constructed by vector values obtained in the S303.

S305: A TD_IDF value of each entry is calculated by the TD_IDF model.

S306: A corresponding LSI (Latent Semantic Index) model is constructed by the TD_IDF value of each entry.

S307: A root entry in the secondary combination subject is imported and vectorized.

S308: A vector value of the root entry in the secondary combination subject obtained in the S307 is imported into the LSI model constructed in the S306.

S309: The vector values of the entries obtained in the S303 are imported into the LSI model constructed in the S306, and a cosine similarity calculation model is constructed.

S310: The values obtained in the S308 are imported into the cosine similarity calculation model, and cosine similarities between the root entry in the secondary combination subject and all entries in the primary combination subject are output.

Referring to FIG. 6 that shows the calculation of a cosine similarity between entries and texts, the implementation steps will be described in detail below.

S401: A genism database is imported.

S402: Texts corresponding to all entries in the primary combination subject are imported into a self-established list of texts, with the texts being separated by commas.

S403: All texts are vectorized.

S404: A corresponding TD_IDF model is constructed by vector values obtained in the S403.

S405: A TD_IDF value of each entry is calculated by the TD_IDF model.

S406: A corresponding LSI model is constructed by the TD_IDF value of each entry.

S407: A root entry in the secondary combination subject is imported and vectorized.

S408: The vector value obtained in the S407 is imported into the LSI model constructed in the S406.

S409: The vector values obtained in the S403 are imported into the LSI model constructed in the S406, and a cosine similarity calculation model is constructed.

S410: The values obtained in the S408 are imported into the cosine similarity calculation model, and cosine similarities between texts corresponding to the root entry in the secondary combination subject and all entries in the primary combination subject are calculated.

Figure 7:
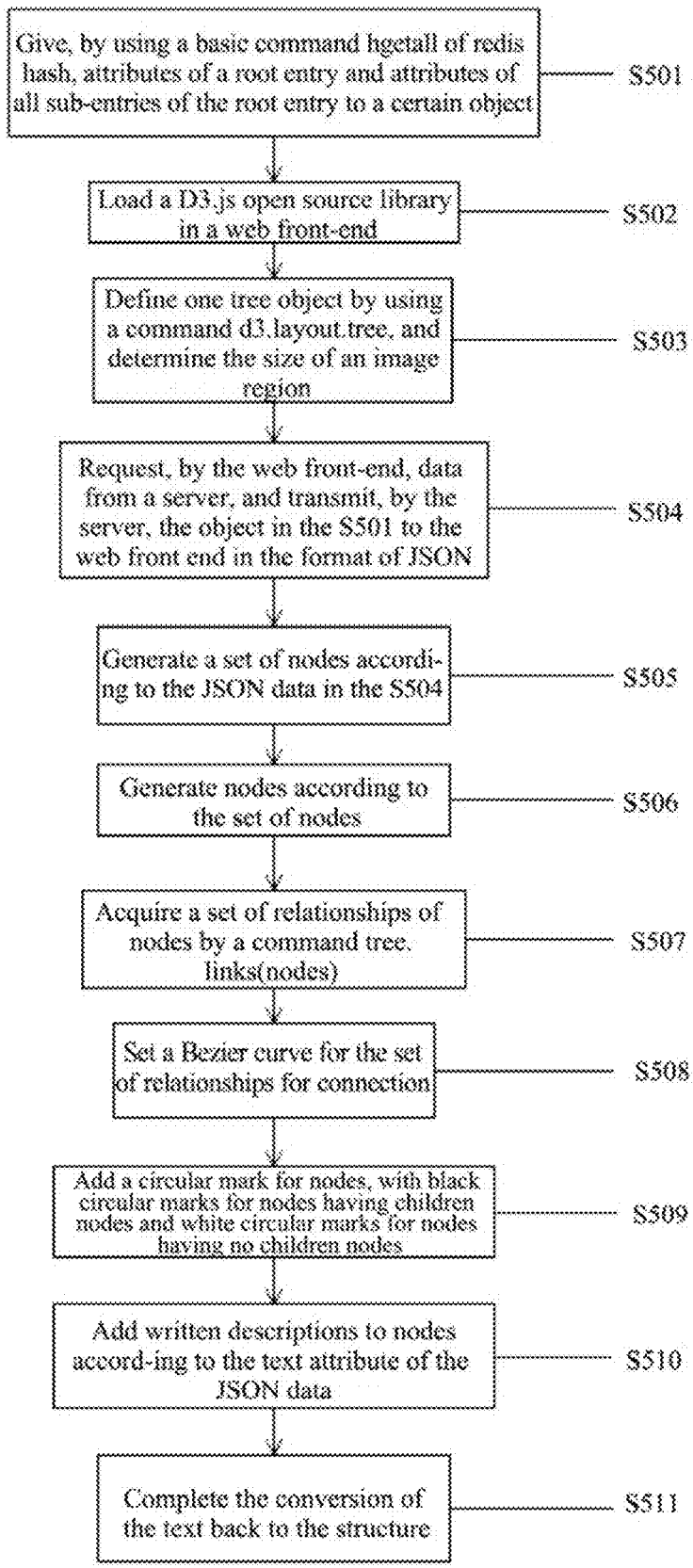
FIG. 7 shows a flowchart of converting a text into an entry structure, according to the present invention.

During the conversion of the combined text back to the entry as shown in FIG. 1, entry attributes involved in the text are stored as an entry structure in accordance with key-value pairs by hash storage, wherein the entry attributes include entry ID, entry name, entry text, parent entry and children entry. All entries and entry attributes are stored in the database redis by hash storage. The specific implementation steps will be further described below, as shown in FIG. 7.

S501: By using a basic command hgetall of redis hash, attributes of a root entry and attributes of all sub-entries of the root entry are given to a certain object.

S502: A D3.js open source library is loaded in a web front-end.

S503: One tree object is defined by using a command d3.layout.tree, and the size of an image region is determined.

S504: Data is requested by the web front-end from a server, and the object in the S501 is transmitted by the server to the web front end in the format of JSON.

S505: A set of nodes is generated according to the JSON data in the S504.

S6: Nodes are generated according to the set of nodes.

S507: A set of relationships of nodes is acquired by a command tree.links(nodes).

S508: A Bezier curve is set for the set of relationships for connection.

S509: A circular mark is added for nodes, with black circular marks for nodes having children nodes and white circular marks for nodes having no children nodes.

S510: Description is added to nodes according to the text attribute of the JSON data.

S511: The conversion of the text back to the structure is completed.

The tool mentioned in this embodiment is used in python, wherein D3, genism and redis are all open source libraries of python. Texts refer to a self-established list. TD_IDF and LSI are models for the open source library gensim. Hgetall is a basic command for the open source library redis. Tree is an object defined by the command d3.layout.tree of the open source library D3. JSON is a data format. Nodes refer to a self-established set of nodes. The execution speed of the algorithm in this embodiment is higher than that in the second embodiment.

Second Embodiment of the Method for Combining Entry Structures

FIG. 1 shows the implementation of the method for combining entry structures, according to the present invention. The method is implemented by following three steps of: first, converting an entry structure into a text; then combining, in the format of text and based on a cosine similarity between entries and a cosine similarity between entries and texts, a plurality of texts into one text; and finally, converting the combined text back to the entry structure.

In the description of this embodiment, two entry structures shown in FIG. 2 are used as an example. The entry attributes include entry ID, entry name, entry text, parent entry and children entry. During the conversion of the entry structure into the text, entry attributes of a root entry in an entry structure and entry attributes of all sub-entries of the root entry are read in the format of text.

At present, a D3 open source library is usually used for the structured display of the network. That is, the D3 open source library displays entries stored in a server in a tree diagram. Entry attributes are stored in accordance with key-value pairs, i.e., a mapping table of a string-type field and a value. Therefore, hash storage is applicable to the above storage. The entry with an ID of 888 is a root entry of a certain structure and thus its parent entry is null. That is, there is no parent entry.

In the web rear-end, the entries and the entry attributes are stored in a key-value database redis. The entry attributes of each created entry are stored in the database redis by hash storage. When it is necessary to convert the format, attributes of the root entry and attributes of all sub-entries of the root entry are taken out, by using a basic command hgetall of redis hash. As shown in FIG. 2, an example of partial storage information of the entry structure in the database is as follows:

ID: 888
name: 1.1
text: aaaabbbbcccc parent: null
children: 1.1.1 1.1.2 1.1.3 1.1.4
ID: 999
name: 1.1.2
text: ddddeeeeffff
parent: 1
children: 1.1.2.1 1.1.2.2 1.1.2.3

By the conversion of an entry structure into a text, the first structure is converted into a first text and the second structure is converted into a second text. An example of conversion of two structures shown in FIG. 2 into texts is as follows:

First text:

| First layer:  | 1.1     |         |         |       |
|---------------|---------|---------|---------|-------|
| Second layer: | 1.1.1   | 1.1.2   | 1.1.3   | 1.1.4 |
| Third layer:  | 1.1.2.1 | 1.1.2.2 | 1.1.2.3 |       |

Second text:

| First layer:  | 2.1     |         |         |
|---------------|---------|---------|---------|
| Second layer: | 2.1.1   | 2.1.2   | 2.1.3   |
| Third layer:  | 2.1.2.1 | 2.1.2.2 | 2.1.2.3 |

Figure 4:
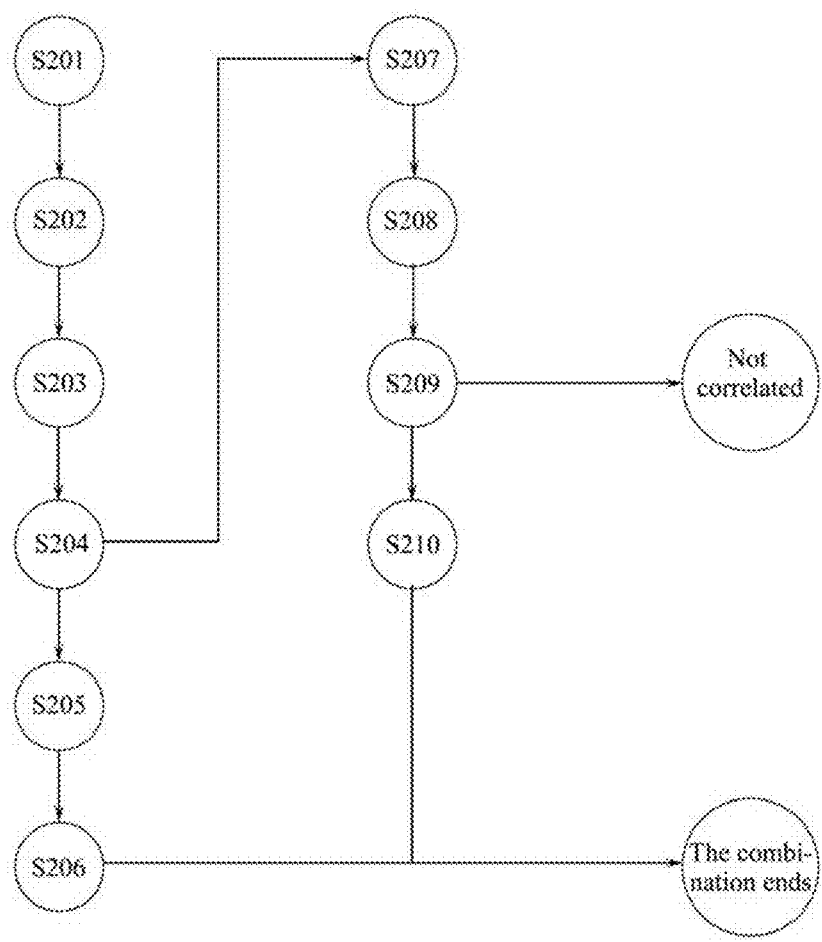
FIG. 4 shows a flowchart of a second embodiment of text combination, according to the present invention.

The combination of combinations is implemented, based on a cosine similarity between entries and a cosine similarity between entries and texts. The specific implementation steps are shown in FIG. 4. The steps shown in FIG. 4 will be described in detail below.

S201: The number of entries in the first text and the number of entries in the second text are compared, and the text with a greater number of entries is used as a primary combination subject and the text with a smaller number of entries is used as a secondary combination subject.

S202: All entries in the primary combination subject are traversed by all entries in the secondary combination subject to obtain corresponding cosine similarities.

S203: The cosine similarities obtained in the S202 are compared, to obtain a value of a maximum cosine similarity.

S204: S205 is executed if the value of the maximum cosine similarity obtained in the S203 is greater than the first threshold (80%), otherwise S207 is executed.

S205: Two entries that correspond to the maximum cosine similarity in the primary combination subject and the secondary combination subject are recorded, the entry in the secondary combination subject is combined into the entry in the primary combination subject, and the secondary combination subject is kept unchanged.

For example, two entries that correspond to the maximum cosine similarity are 1.1.3 and 2.1.2, the entry 2.1.2 in the secondary combination subject is combined into the entry 1.1.3 in the primary combination subject, the text that is the secondary combination subject is kept unchanged, and the text that is the primary combination subject is changed as follows:

The name of the entry 2.1.2 and the name of the entry 1.1.3 are combined as entry 1.1.3, wherein the text of the entry 2.1.2 and the text of the entry 1.1.3 are combined in segments, and the sub-entries of the entry 2.1.2 and the sub-entries of the entry 1.1.3 become the sub-entries of the new entry 1.1.3.

S206: A cosine similarity between any two of all sub-entries of the combined entry in the primary combination subject is calculated, the two entries are combined if the cosine similarity is greater than the first threshold (80%), the S206 is repeated on the combined entry until the cosine similarity between any two of all sub-entries of the combined entry is less than the first threshold. So far, the combination ends.

S207: Texts of all entries in the primary combination subject are traversed by all entries in the secondary combination subject to obtain corresponding cosine similarities.

S208: The cosine similarities obtained in the S207 are compared, to obtain a value of a maximum cosine similarity.

S209: S210 is executed if the value of the maximum cosine similarity obtained in the S208 is greater than a second threshold (60%), otherwise it is determined that the two texts are not correlated.

S210: Entries that correspond to the maximum cosine similarity in the secondary combination subject and entries that correspond to the corresponding texts in the primary combination subject are recorded, the recorded entries in the secondary combination subject are combined into the recorded entries in the primary combination subject, and the text that is the secondary combination subject is kept unchanged. So far, the combination ends.

For example, entries that correspond to the maximum cosine similarity are 2.1.2 and 1.1.3, the entry 2.1.2 in the secondary combination subject is combined into the entry 1.1.3 in the primary combination subject, the text that is the secondary combination subject is kept unchanged, and the text that is the primary combination subject is changed as follows:

The name of the entry 2.1.2 and the name of the entry 1.1.3 are combined as 2.1.2&1.1.3, wherein the text of the entry 2.1.2 and the text of the entry 1.1.3 are combined in segments, and the sub-entries of the entry 2.1.2 and the sub-entries of the entry 1.1.3 become the sub-entries of the 2.1.2&1.1.3. So far, the combination ends.

In the text combination steps shown in FIG. 4, the calculation of a cosine similarity between entries and a cosine similarity between entries and texts is involved. FIG. 5 shows the calculation of a cosine similarity between entries, and FIG. 6 shows the calculation of a cosine similarity between entries and texts.

Referring to FIG. 5 that shows the calculation of a cosine similarity between entries, the implementation steps will be described in detail below.

S301: A genism database is imported.

S302: All entries in the primary combination subject are imported into a list of texts, with the entries being separated by commas.

S303: All entries are vectorized.

S304: A corresponding TD_IDF model is constructed by vector values obtained in the S303.

S305: A TD_IDF value of each entry is calculated by the TD_IDF model.

S306: A corresponding LSI model is constructed by the TD_IDF value of each entry.

S307: A root entry in the secondary combination subject is imported and vectorized.

S308: A vector value of the root entry in the secondary combination subject obtained in the S307 is imported into the LSI model constructed in the S306.

S309: The vector values of the entries obtained in the S303 are imported into the LSI model constructed in the S306, and a cosine similarity calculation model is constructed.

S310: The values obtained in the S308 are imported into the cosine similarity calculation model, and cosine similarities between the root entry in the secondary combination subject and all entries in the primary combination subject are output.

Referring to FIG. 6 that shows the calculation of a cosine similarity between entries and texts, the implementation steps will be described in detail below.

S401: A genism database is imported.

S402: Texts corresponding to all entries in the primary combination subject are imported into a self-established list of texts, with the texts being separated by commas.

S403: All texts are vectorized.

S404: A corresponding TD_IDF model is constructed by vector values obtained in the S403.

S405: A TD_IDF value of each entry is calculated by the TD_IDF model.

S406: A corresponding LSI model is constructed by the TD_IDF value of each entry.

S407: A root entry in the secondary combination subject is imported and vectorized.

S408: The vector value obtained in the S407 is imported into the LSI model constructed in the S406.

S409: The vector values obtained in the S403 are imported into the LSI model constructed in the S406, and a cosine similarity calculation model is constructed.

S410: The values obtained in the S408 are imported into the cosine similarity calculation model, and cosine similarities between texts corresponding to the root entry in the secondary combination subject and all entries in the primary combination subject are calculated.

During the conversion of the combined text back to the entry as shown in FIG. 1, entry attributes involved in the text are stored as an entry structure in accordance with key-value pairs by hash storage, wherein the entry attributes include entry ID, entry name, entry text, parent entry and children entry. All entries and entry attributes are stored in the database redis by hash storage. The specific implementation steps will be further described below, as shown in FIG. 7.

S501: By using a basic command hgetall of redis hash, attributes of a root entry and attributes of all sub-entries of the root entry are given to a certain object.

S502: A D3.js open source library is loaded in a web front-end.

S503: One tree object is defined by using a command d3.layout.tree, and the size of an image region is determined.

S504: Data is requested by the web front-end from a server, and the object in the S501 is transmitted by the server to the web front end in the format of JSON.

S505: A set of nodes is generated according to the JSON data in the S504.

S6: Nodes are generated according to the set of nodes.

S507: A set of relationships of nodes is acquired by a command tree.links(nodes).

S508: A Bezier curve is set for the set of relationships for connection.

S509: A circular mark is added for nodes, with black circular marks for nodes having children nodes and white circular marks for nodes having no children nodes.

S510: Description is added to nodes according to the text attribute of the JSON data.

S511: The conversion of the text back to the structure is completed.

The tool mentioned in this embodiment is used in python, wherein D3, genism and redis are all open source libraries of python. Texts refer to a self-established list. TD_IDF and LSI are models for the open source library gensim. Hgetall is a basic command for the open source library redis. Tree is an object defined by the command d3.layout.tree of the open source library D3. JSON is a data format. Nodes refer to a self-established set of nodes. This embodiment is more comprehensive than the first embodiment. But the execution speed of the program is lower.

Although the above methods are illustrated and described as a series of acts for simplicity of the explanation, it should be understood and appreciated that these methods are not limited by the order of the acts since, according to one or more embodiments, some acts may occur in different orders and/or concurrently with other acts that have been illustrated and described herein or have not been illustrated and described herein but can be understood by those skilled in the art.

The previous description of the present disclosure is provided to enable any person skilled in the art to make or utilize the present disclosure. Various modifications to the present disclosure will be obvious to those skilled in the art, and the general principles defined herein may be applied to other variations without departing from the spirit or scope of the present disclosure. Therefore, the present disclosure is not intended to be limited to the examples and designs described herein, but rather the broadest scope of the principles and novel features disclosed herein.

What is claimed is:

1. A method for combining entry structures, comprising:
a first step of converting an entry structure into a text, wherein each entry structure comprises an entry ID, an entry name, an entry text, a parent entry, and a child entry stored in a hierarchical structure;
a second step of combining, in format of text and based on a cosine similarity between entries and a cosine similarity between entries and texts, a plurality of texts into one text, the second step comprising:
S1: using a first text as a primary combination subject and a second text as a secondary combination subject;
S2: traversing all entries of the first text by a root entry in the second text to obtain corresponding cosine similarities;
S3: comparing the cosine similarities obtained in the S2, to obtain a value of a maximum cosine similarity;
S4: executing S5 if the value of the maximum cosine similarity obtained in the S3 is greater than a first threshold, otherwise executing S7;
S5: recording an entry that corresponds to the value of the maximum cosine similarity in the primary combination subject, and combining a root entry in the secondary combination subject into the recorded corresponding entry in the primary combination subject to execute S6;
S6: calculating a cosine similarity between any two of all sub-entries of the combined entry, combining the two entries if the cosine similarity is greater than the first threshold, and repeating the S6 on the combined entry until the cosine similarity between any two of all sub-entries of the combined entry is less than the first threshold;
S7: using the second text as the primary combination subject and the first text as the secondary combination subject;
S8: traversing all entries in the second text by the root entry in the first text to obtain a corresponding cosine similarity;
S9: comparing the cosine similarities obtained in the S8, to obtain a value of a maximum cosine similarity;
S10: executing S11 if the value of the maximum cosine similarity obtained in the S9 is greater than the first threshold, otherwise executing S13;

S11: recording an entry that corresponds to the value of the maximum cosine similarity in the primary combination subject, and combining a root entry in the secondary combination subject into the recorded corresponding entry in the primary combination subject to execute S12;

S12: calculating a cosine similarity between any two of all sub-entries of the combined entry, combining the two entries if the cosine similarity is greater than the first threshold, and repeating the S12 on the combined entry until the cosine similarity between any two of all sub-entries of the combined entry is less than the first threshold;

S13: again, using the first text as the primary combination subject and the second text as the secondary combination subject;

S14: traversing texts of all entries of the first text by the root entry in the second text to obtain corresponding cosine similarities;

S15: comparing the cosine similarities obtained in the S14, to obtain a value of a maximum cosine similarity;

S16: executing S17 if the value of the maximum cosine similarity obtained in the S15 is greater than a second threshold, otherwise executing S18;

S17: recording an entry that corresponds to the value of the maximum cosine similarity in the primary combination subject, and combining the root entry in the secondary combination subject into the recorded corresponding entry in the primary combination subject;

S18: using the second text as the primary combination subject and the first text as the secondary combination subject;

S19: traversing texts of all entries in the second text by the root entry in the first text to obtain corresponding cosine similarities;

S20: comparing the cosine similarities obtained in the S19, to obtain a value of a maximum cosine similarity;

S21: executing S22 if the value of the maximum cosine similarity obtained in the S20 is greater than the second threshold, otherwise determining that the texts of the two entries are not correlated; and S22: recording an entry that corresponds to the value of the maximum cosine similarity in the primary combination subject, combining the root entry in the secondary combination subject into the recorded corresponding entry in the primary combination subject, and ending the combination; and a third step of converting the combined text back to the entry structure.

2. The method for combining entry structures according to claim 1, wherein, in the first step, entry attributes in an entry structure are stored in accordance with key-value pairs by hash storage, the entry attributes including entry ID, entry name, entry text, parent entry and children entry; and during the conversion of the entry structure into the text, entry attributes of a root entry in an entry structure and entry attributes of all sub-entries of the root entry are read in the format of text.

3. The method for combining entry structures according to claim 1, wherein the second step further comprising:

S201: comparing the number of entries in a first text and the number of entries in a second text, and using the text with a greater number of entries as a primary combination subject and the text with a smaller number of entries as a secondary combination subject;

S202: traversing all entries in the primary combination subject by all entries in the secondary combination subject to obtain corresponding cosine similarities;

S203: comparing the cosine similarities obtained in the S202, to obtain a value of a maximum cosine similarity;

S204: executing S205 if the value of the maximum cosine similarity obtained in the S203 is greater than a first threshold, otherwise executing S207;

S205: recording two entries that correspond to the maximum cosine similarity in the primary combination subject and the secondary combination subject, combining the entry in the secondary combination subject into the entry in the primary combination subject, and keeping the secondary combination subject unchanged to execute S206;

S206: calculating a cosine similarity between any two of all sub-entries of the combined entry in the primary combination subject, combining the two entries if the cosine similarity is greater than the first threshold, repeating the S206 on the combined entry until the cosine similarity between any two of all sub-entries of the combined entry is less than the first threshold, and ending the combination;

S207: traversing texts of all entries in the primary combination subject by all entries in the secondary combination subject to obtain corresponding cosine similarities;

S208: comparing the cosine similarities obtained in the S207, to obtain a value of a maximum cosine similarity;

S209: executing if the value of the maximum cosine similarity obtained in the S208 is greater than a second threshold, otherwise determining that the two texts are not correlated; and S210: recording entries that correspond to the maximum cosine similarity in the secondary combination subject and entries that correspond to the corresponding texts in the primary combination subject, combining the recorded entries in the secondary combination subject into the recorded entries in the primary combination subject, keeping the text that is the secondary combination subject unchanged, and ending the combination.

4. The method for combining entry structures according to claim 3, wherein the calculation of a cosine similarity between entries comprises:

S301: importing a genism database;

S302: importing all entries in the primary combination subject into a list of texts, with the entries being separated by commas;

S303: vectorizing all entries;

S304: constructing a corresponding term frequency-inverse document frequency TD_IDF model by vector values obtained in the S303;

S305: calculating a TD_IDF value of each entry by the TD_IDF model;

S306: constructing a corresponding Latent Semantic Index LSI model by the TD_IDF value of each entry;

S307: importing a root entry in the secondary combination subject, and vectorizing the root entry;

S308: importing a vector value of the root entry in the secondary combination subject obtained in the S307 into the LSI model constructed in the S306;

S309: importing the vector values of the entries obtained in the S303 into the LSI model constructed in the S306, and constructing a cosine similarity calculation model; and S310: importing the values obtained in the S308 into the cosine similarity calculation model, and outputting cosine similarities between the root entry in the secondary combination subject and all entries in the primary combination subject.

5. The method for combining entry structures according to claim 3, wherein the calculation of a cosine similarity between entries and texts comprises:
  S401: importing a genism database;
  S402: importing texts corresponding to all entries in the primary combination subject into a list of texts, with the texts being separated by commas;
  S403: vectorizing all texts;
  S404: constructing a corresponding TD_IDF model by vector values obtained in the S403;
  S405: calculating a TD_IDF value of each entry by the TD_IDF model;
  S406: constructing a corresponding LSI model by the TD_IDF value of each entry;
  S407: importing a root entry in the secondary combination subject, and vectorizing the root entry;
  S408: importing the vector value obtained in the S407 into the LSI model constructed in the S406;
  S409: importing the vector values obtained in the S403 into the LSI model constructed in the S406, and constructing a cosine similarity calculation model; and
  S410: importing the values obtained in the S408 into the cosine similarity calculation model, and calculating cosine similarities between texts corresponding to the root entry in the secondary combination subject and all entries in the primary combination subject.

6. The method for combining entry structures according to claim 1, wherein, during the conversion of the text back to the entry structure in the third step, entry attributes involved in the text are stored as an entry structure in accordance with key-value pairs by hash storage, the entry attributes including entry ID, entry name, entry text, parent entry and children entry.

7. The method for combining entry structures according to claim 1, wherein the third step further comprising:
  S501: giving, by using a basic command hgetall of redis hash, attributes of a root entry and attributes of all sub-entries of the root entry to a certain object;
  S502: loading a D3.js open source library in a web front-end;
  S503: defining one tree object by using a command d3.layout.tree, and determining the size of an image region;
  S504: requesting, by the web front-end, data from a server, and transmitting, by the server, the object in the S501 to the web front end in the format of JSON;
  S505: generating a set of nodes according to the JSON data in the S504; and
  S506: generating nodes according to the set of nodes;
  S507: acquiring a set of relationships of nodes by a command tree.links(nodes);
  S508: setting a Bezier curve for the set of relationships for connection;
  S509: adding a circular mark for nodes, with black circular marks for nodes having children nodes and white circular marks for nodes having no children nodes;
  S510: adding written descriptions to nodes according to the text attribute of the JSON data; and
  S511: completing the conversion of the text back to the structure.

* * * * *